United States Patent [19]
Ranninger et al.

[11] 4,145,113
[45] Mar. 20, 1979

[54] COLOR CORRECTING INTERFERENCE FILTER

[75] Inventors: Guenther Ranninger; Franz Twaroch, both of Vienna, Austria

[73] Assignee: C. Reichert Optische Werke, AG, Vienna, Austria

[21] Appl. No.: 822,123

[22] Filed: Aug. 5, 1977

[51] Int. Cl.² .............................................. G02B 5/28
[52] U.S. Cl. ................................................... 350/166
[58] Field of Search ........................ 350/166, 165, 164

[56] References Cited
U.S. PATENT DOCUMENTS 2,742,819  4/1956  Koch et al. ............................ 350/166

FOREIGN PATENT DOCUMENTS 2300790  8/1973  Fed. Rep. of Germany ........... 350/166
2406890  8/1974  Fed. Rep. of Germany ........... 350/166
 793045  4/1958  United Kingdom .................... 350/166

OTHER PUBLICATIONS

Dobrowolski, *Applied Optics*, vol. 9, No. 6, Jun. 1970, pp. 1396–1402.

*Primary Examiner*—Ronald J. Stern
*Attorney, Agent, or Firm*—Jeremiah J. Duggan; Alan H. Spencer

[57] ABSTRACT

An interference filter having a plurality of alternating layers of high and low index of refraction and layer thickness increasing toward the center can compensate for errors in spectral energy distribution produced by an optical system.

2 Claims, 3 Drawing Figures

COLOR CORRECTING INTERFERENCE FILTER

BACKGROUND OF THE INVENTION

The invention is involved with optical instruments, especially microscopes, with a light source the radiation of which passes through an optical system having light refracting and/or reflecting optical elements onto a radiation sensitive receiver, such as a photographic film or a television camera. In the ray-path between light source and receiver, a multiple interference filter is arranged having several dielectric layers located on a transparent carrier to collect changes in the energy balance caused by the optical system.

Color films and also television cameras are adjusted by the manufacturer to respond in a certain manner to a very definite color temperature of the light source. For artificial light, this color temperature generally is 3,200°-K.; for day light, 6,000°-K. If the color temperature of the light source deviates from the color temperature for which the receiver is intended, whether it be a photographic film or a television camera, one does not get true-color reproduction of the specimen being photographed or observed via television.

While there now exists the possibility of excluding color alterations by the choice of an appropriate light source, one must start from the realization that optical systems nowadays, practically without exception, contain reflection-reducing coatings on the optical elements whether they be prisms or lenses. The action of such coatings is not uniform, but exhibits towards the short and long wave lengths of the visible spectrum in a general increase in the amount of reflection. In conjunction with the sequential insertion of several optical elements, a corresponding heightening of this color-dependent differential reflection occurs; which means that the amount of red or blue radiation reaching the receiver is too small. Due to this, a sometimes very appreciable color alteration occurs. It should be further considered that highly refractive glasses already absorb the near UV-range which increases the amount of yellowish tinge. Hence, if one wishes to get perfect color photos in conjunction with such an instrument, then it is necessary to be concerned with correction of such color alterations. To this end, attempts have been made to use several colored filters, for instance glass or gelatin filters. However, practically all colored materials show a strong absorption in the UV and blue range which results in the blue portion of the spectrum, which has been already adversely affected by the optical system, to be even further weakened, and thus the yellowish tinge is further enhanced. The use of multiple filters is especially disadvantageous in that intensive attenuation causes an appreciable prolonging of the exposure time required for the film or camera.

The spectral transmissivity available glasses or laminates are limited, and even by careful combination of several different kinds of filters, only an inadequate correction is possible. Even if one attempts to achieve an optimal correction with multiple filters, the result in optical instruments having many optical elements (especially with microscopes) may indeed have correct specimen color, but the background is yellow. Although a white background is achievable, a certain distortion of the specimen colors is then unavoidable.

In addition to the above-discussed deficiencies, there are also difficulties in conjunction with the use of cemented laminates because they have limitations on their location in the instrument due to optical and thermal reasons. For instance, due to lack of plano-parallelism and differing indices of refraction of cover glass, laminate, and cement, they are unsuited for location in the observation system. In the illuminational system, the utilization of cemented laminates causes difficulties due to high temperatures.

The use of colored glasses is undesirable because selection of thickness and color shade is critical. Furthermore, with color filters, the exposure times of photographic films are determined experimentally and then must be very accurately followed, although the film would normally have a much greater tolerance to exposure variations. The reason for this is the fact that the spectral sensitivity of the film is not consistent with "unnatural" color transmission of the given optical instrument. Colored glasses have the further disadvantage that, due to variations from filter to filter, one gets differing spectral distribution curves although the "same" colored glass was used.

Filters for optical instruments are also known, which make it possible to change the color temperature (spectral energy distribution) of the light source into a color temperature suitable for a specific receiver. In conjunction with such conversion filters, the point of departure from the present invention is that the light source, generally a temperature radiator or incandescent lamp, possesses the correct energy distribution. The energy distribution of the light source is redistributed into light of another color temperature. Even with redistribution, for which interference filters of the type disclosed in DT-OS 23 00 790 are already used, the above-discussed color alterations still occur because of the optical system of the instrument. Therefore, color-tinge of the photo caused by the wrong color temperature is avoided, but certain color alterations still do occur.

BRIEF DESCRIPTION OF THE PRESENT INVENTION AND DRAWINGS

The present invention is based on constructing an optical device of the filter type, that avoids the above-discussed deficiencies. Particularly, the present invention is directed to the exclusion of the color alterations originating from the instrument itself, that is, different color alterations in every system. For this purpose and according to the invention, it is proposed that the coating of the interference filter consist of materials with good transmission characteristics and sequential layers of different indices of refraction and thicknesses, canceling color alterations caused by the optical system whereby the energy distribution of the radiation reaching the receiver is consistant to the emission spectrum of the light source.

The nature of the invention therefore is to be viewed in the fact that a multiple-layer interference filter, known in itself, is to be used for the correction of the color alterations. In accordance with the present invention, it is proposed for the first time to cancel color errors caused by the optical elements of the instrument itself, and to do so using a novel multiple-layer interference filter. Heretofore, no attempt was made to correct this source of error (by the optical system) inasmuch as the conversion filters inserted for the changing of the color temperature did not compensate for alteration of the energy distribution caused by the optical system. Reference can be once more made here to DT-OS 23 00 790. There, also, only the possibility is addressed of varying the transparency of the filter over practically the entire visible spectrum range, dependent on the angle of incidence. Even the well-known corrective photographic filters afforded, heretofore, only the possibility of selectively correcting a very select spectral range, where, in given circumstances, a large number of corrective filters had to be inserted one after the other. Many filters can lead to such an intensive diminution of the energy of the light source, that there is insufficient residual light at the microscopic receiver for pictures. According to the invention, the possibility is now afforded for the first time of canceling color alterations individually for the specific instrument, whereby the same filter can be used practically for all films of the same color temperature, inasmuch as the energy distribution of the light source, which is representative of color temperature, is re-established in each and every case in front of the receiver. The multiple interference filter constructed in accordance with the invention can be introduced in various locations along the light path of the optical instrument. In general, filters are introduced where the light rays are not concentrated and where the ray-divergence is small. In a microscope having a photographic attachment, it is moreover favorable to introduce the filter in the light-path in front of the eyepiece/photography axis separation, inasmuch as the image is also color corrected at the eyepiece.

In conjunction with the use of an interference filter, according to the invention, the advantage is also realized in the absence of absorption in the blue and UV spectral range. The spectral transmission of the filter can readily be adjusted to a particular optical system, as the thickness of the layers and their composition or sequence is varied. For those skilled in the art, this does not involve any difficulties in determining, (by measurement of the spectral curve of an optical system) which wave length corrections are required, and then adjusting the multiple layer interference filter through selection of thickness, sequence, and refractive index of the dielectric layers. The filter, according to the invention, is relatively transmissive and the original spectral energy distribution of the light source is reestablished at the receiver, providing tolerance to exposure variations as indicated by the manufacturer for films.

It is further proposed, according to the invention, that the interference filter additionally effects an adjustment of the energy distribution of the light source to the spectral sensitivity of the receiver. This can likewise be accomplished by selection of the filter coating, for which purpose and under given circumstances, the number of the dielectric layers has to be increased. In so doing, the possibility of adjusting for differences in the color temperature of the light source and of the receiver is accommodated. On the other hand, it is already known that some receivers possess a spectral sensitivity different from the spectral distribution corresponding to the actual energy distribution of light sources. Such differences can also be corrected by insertion of multiple interference filters depending on the receiver.

In the device according to the invention, the possibility exists therefore, for instance, to affect a correction without change of the color temperature, hence only a correction of the instrument optical system color errors (briefly stated, 3,200° K. "false", at 3,200° K. "correct"). On the other hand, however, the possibility is likewise afforded, along with the correction of the instrument optical system errors, to also change the color temperature, which briefly can be expressed as a change of, for instance, 3,200° K. "false" into 6,000° K. "correct".

An especially simple way to manufacture such interference filters is evaporating layers forming the coating of the interference filter onto the transparent carrier.

Usually, it will be undertaken in such a way, that all layers forming the coating are provided on a single carrier, for instance a special glass plate. However, there certainly also exists the possibility of distributing the layers forming the coating of the interference filter onto several transparent carriers arranged in back of each other in the ray-path and one of the optical elements of the instrument optical system can serve as the transparent carrier of the interference filter. The selective insertion of an additional interference filter for adaptation of the spectral sensitivity of the receiver can then be accomplished simply.

Experiments have shown that the coating should be constructed of layers with alternating high and low refractive indices, in which the ratio of the refractive indices ($n_H$:$n_L$) of the sequential high and low refractive layers is about 1.5:1.

For the achievement of an especially good color correction, it is desirable that the coating consists of more than seven dielectric layers and the two outer and the two inner layers of the coating on the transparent carrier possess a layer-thickness less than $\lambda_o/4$, in which 480 nm $\ominus$ $\lambda_o$ $\leqq$ 670 nm and also it may be desirable to have the layers therebetween have a thickness of about $\lambda_o/4$. as used herein, the term thickness refers to optical thickness.

THE PREFERRED EMBODIMENTS

Further features, details and advantages of the invention are apparent from the following description of an embodiment, reference being made to the drawing. The drawing shows:

Figure 1:
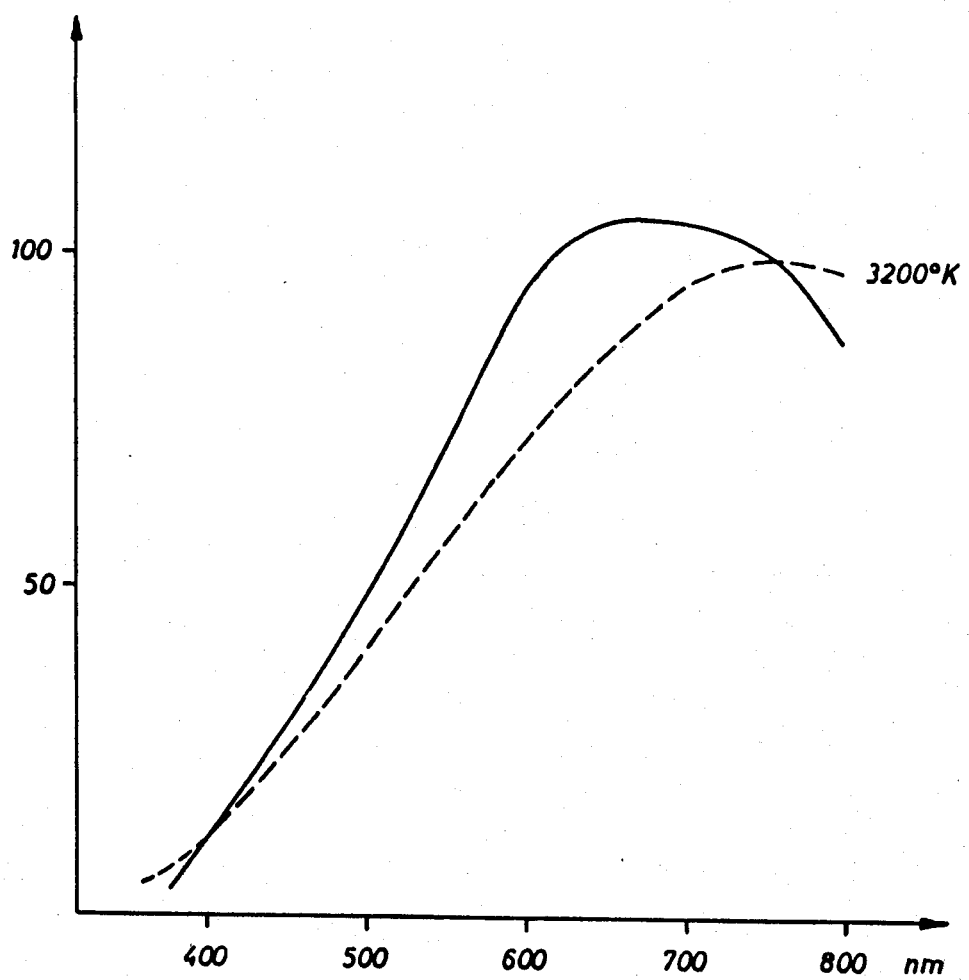
FIG. 1 is a graphic representation of the spectral energy distribution of a light source having a color temperature of 3,200° K. and the energy distribution curve after passing through an instrument optical system.
Figure 2:
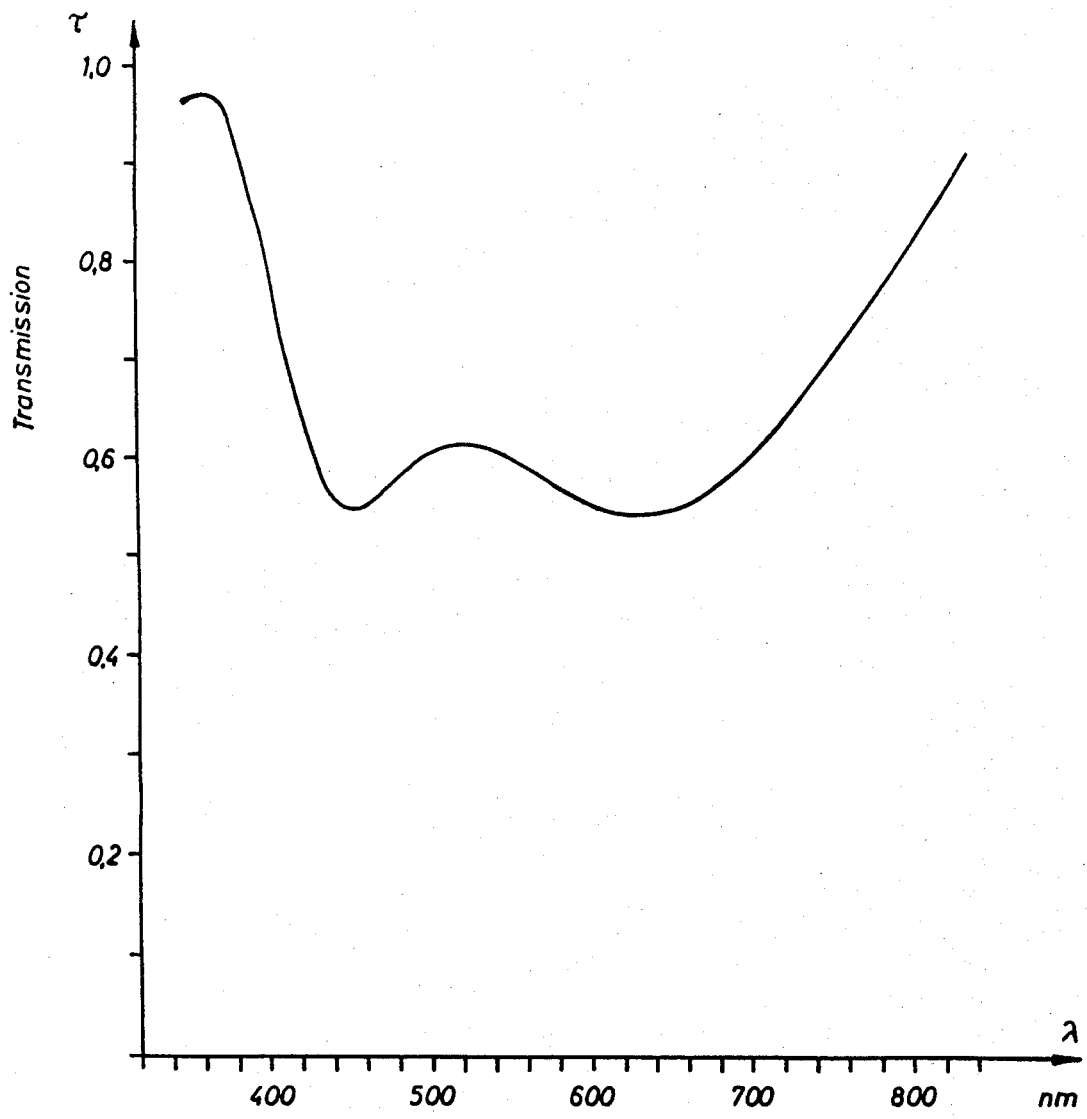
FIG. 2 is a graphic representation, according to the present invention, of the transmissivity of an interference filter as a function of the wave length.
Figure 3:
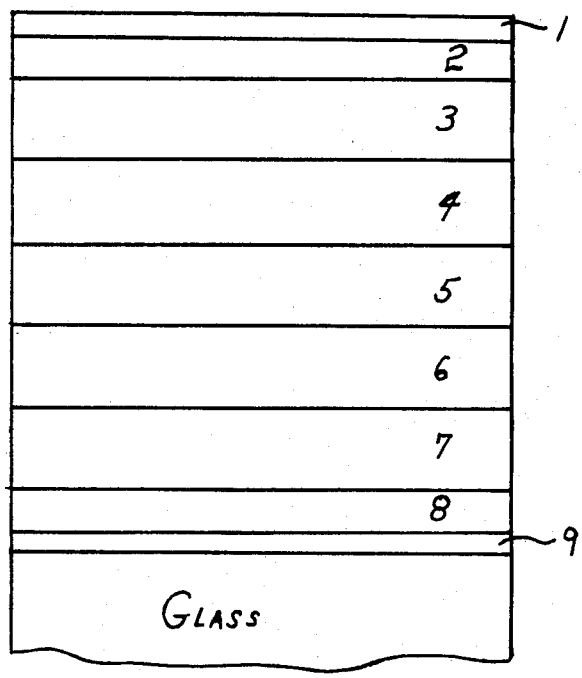
FIG. 3 shows a section through an interference filter used in conjunction with the optical instrument, according to the invention.

As FIG. 1 shows, there occurs, on transmission of the light having a color temperature of 3,200° K. (dotted curve) through an instrument optical system as a consequence of the above described circumstances, a shift of the spectral distribution, as represented by the solid line in FIG. 1. By using a filter according to the invention, color correction canceling the effects of the optical system are obtained so that on the receiver, the same spectral distribution is presented as corresponds to the ideal energy distribution of a light source with 3,200° K., that is, according to the dotted curve in FIG. 1. To accomplish this, a filter is used having the transmission curve corresponding to FIG. 2. The transmission curve according to FIG. 2 can be obtained with a filter having the construction shown in FIG. 3 and described in the following table.

TABLE

| Layer | Refractive Index | Material | Layer-Thickness (nm) |
|---|---|---|---|
| 1 | 2.05 | $ZrO_2$ | 35 |

TABLE-continued

| Layer | Refractive Index | Material | Layer-Thickness (nm) |
|---|---|---|---|
| 2 | 1.38 | MgF$_2$ | 70 |
| 3 | 2.05 | ZrO$_2$ | 140 |
| 4 | 1.38 | MgF$_2$ | 140 |
| 5 | 2.05 | ZrO$_2$ | 140 |
| 6 | 1.38 | MgF$_2$ | 140 |
| 7 | 2.05 | ZrO$_2$ | 140 |
| 8 | 1.38 | MgF$_2$ | 70 |
| 9 | 2.05 | ZrO$_2$ | 35 |
| Carrier | 1.52 | Glass | |

As is evident from the foregoing table, the layers 3 to 7 of the filter, according to the example, possess the same thickness, about $\lambda_o/4$, with $\lambda_o$ having an average wave length of 560 nm. The innermost layers 8 and 9 and the outermost layers 1 and 2 have a thickness less than $\lambda_o/4$. Preferably, 1 and 9 have a thickness of about $\lambda_o/16$; and 2 and 8 have a thickness of about $\lambda_o/8$. In so doing, the inner and outer layer is only 35 nm thick in each case, while the second layers of inner and outer have, in each case, a thickness of 70 nm.

The modification of the interference filter to the color alterations of differing instruments can be accomplished in a simple manner by changing the thicknesses of layers, use of materials having other refractive indices, change of the sequence, etc., in conjunction with which there are practically no restrictions. In so doing, the number of the layers is a function of the material used in each case, but also is a function of what modification is desired. With more intensive modification of the color temperature for instance, more layers have to be used than would be necessary for canceling color errors without change of the overall color temperature. The complexity of the instrument optical system, the number of components, and the nature of coatings used in the optical system can also affect the amount of correction required, and thus the number and type of layers on the interference filter.

Reference being made to the example, it is further evident that the ratio of the indices of refraction of the high and low refracting layers, in sequence, amounts to about 1.5:1.

As coating materials having a low index of refraction, magnesium fluoride, calcium fluoride, cryolite and lithium fluoride are involved; while coating materials having a high refractive index include cerium oxide, niobium (V) oxide, yttrium oxide, and zirconium oxide.

In conclusion, reference should once more be made to the fact that the invention naturally can be applied not only with microscopes, in conjunction with which, however, these instruments do represent to be sure, the main field of utilization. It would be entirely conceivable also, to have other optical instruments in which a color-correct reproduction is desirable. Further, it should be mentioned that the differing transmission of the interference filter used in conjunction with the invention is achieved by selective reflection, whereby and as a consequence of the good transmission properties, a particularly small light loss results in areas which are not to be altered.

What is claimed is:

1. In an instrument having a light source with a chosen spectral energy distribution, an optical system including optical elements that change the energy distribution of light passing therethrough and detection means responsive to light, the detection means being adapted to respond in a given manner to said chosen energy distribution, the improvement comprising an interference filter having a transparent substrate and nine alternating layers of first and second dielectric coating materials; said first material having a given index of refraction; said second material having an index of refraction of about 1.5 times said given index of refraction; the first and ninth layers having a thickness of $\lambda_o/16$, the second and eighth layers having a thickness of $\lambda_o/8$ and the remaining layers having a thickness of $\lambda_o/4$ and where 480 nm $\leq \lambda_o \leq$ 670 nm.

2. The improvement according to claim 1 wherein the interference filter has the following parameters:

| Layer | Refractive Index | Material | Layer-Thickness (nm) |
|---|---|---|---|
| 1 | 2.05 | ZrO$_2$ | 35 |
| 2 | 1.38 | MgF$_2$ | 70 |
| 3 | 2.05 | ZrO$_2$ | 140 |
| 4 | 1.38 | MgF$_2$ | 140 |
| 5 | 2.05 | ZrO$_2$ | 140 |
| 6 | 1.38 | MgF$_2$ | 140 |
| 7 | 2.05 | ZrO$_2$ | 140 |
| 8 | 1.38 | MgF$_2$ | 70 |
| 9 | 2.05 | ZrO$_2$ | 35 |
| Substrate | 1.52 | Glass | |

* * * * *